United States Patent [19]
Imoto

[11] Patent Number: 5,497,445
[45] Date of Patent: Mar. 5, 1996

[54] POLYMER CORE OPTICAL WAVE-GUIDE AND FABRICATION METHOD THEREOF

[75] Inventor: Katsuyuki Imoto, Sayama, Japan

[73] Assignee: Hitachi Cable, Inc., Japan

[21] Appl. No.: 313,984

[22] Filed: Sep. 27, 1994

[30] Foreign Application Priority Data

Sep. 27, 1993 [JP] Japan .................. 5-239747

[51] Int. Cl.$^6$ .................................. G02B 6/13
[52] U.S. Cl. .................. 385/143; 385/132; 430/321; 430/322
[58] Field of Search .................. 385/129–132, 385/141–145; 430/321–329

[56] References Cited

U.S. PATENT DOCUMENTS

| | | | |
|---|---|---|---|
| 5,062,680 | 11/1991 | Imamura et al. | 385/131 |
| 5,291,574 | 3/1994 | Levenson et al. | 385/129 |
| 5,317,082 | 5/1994 | Beuhler et al. | 385/129 X |
| 5,322,986 | 6/1994 | Nutt | 219/121.6 |
| 5,402,514 | 3/1995 | Booth et al. | 385/130 |

FOREIGN PATENT DOCUMENTS

| | | |
|---|---|---|
| 3-158802 | 7/1991 | Japan . |
| 3-188402 | 8/1991 | Japan . |
| 4-9807 | 1/1992 | Japan . |
| 4-328504 | 11/1992 | Japan . |

OTHER PUBLICATIONS

High Refractive Index Difference And Low Loss Optical Waveguide Fabricated By Low Temperature Processes, K. Imoto and A. Hori, Electronics Letters, Jun. 10, 1993, vol. 29, No. 12, 2 pages (pp. 1123–1124).

Silica–Based Waveguides and their Application to Integrated Optical Components, Katsuyuki Imoto, New Ceramics 1993, vol. 6, No. 6, pp. 59–63 (no month).

A Novel Technology for Reduction in Cost and Size of Silica Guided–Wave Component, Katsuyuki Imoto et al, Technical Report of IEICE QQE92–110, pp. 7–14, Oct. 1992.

Silica Guided–Wave Devices, Katsuyuki Imoto, Microelectronic and Optoelectronic Packaging, pp. 43–56 (no date available).

Primary Examiner—John D. Lee
Attorney, Agent, or Firm—Evenson, McKeown, Edwards & Lenahan

[57] ABSTRACT

A polymer core optical wave-guide which comprises a substrate, a buffer layer formed on the surface of the substrate made of a $SiO_xN_yH_z$ film of desirable thickness having a refractive index of $n_b$, an approximately rectangle-shaped core formed on the buffer layer made of a polymer material having a refractive index of $n_w$ ($n_w > n_b$), a cladding layer covering the surface of the core having a refractive index of $n_c$ ($n_c < n_w$).

16 Claims, 5 Drawing Sheets

RELATIONSHIP BETWEEN REFRACTIVE INDEX AND NITROGEN CONTENT IN SiOxNyHz FILM

FIG. 7

| NAME OF CIRCUIT | FIGURE OF STRUCTURE | FUNCTION |
|---|---|---|
| BRANCHING/ MERGING (STARCOUPLER) | | 1:N BRANCH<br>N:1 MERGE<br><br>N:N BRANCH · MERGE<br>N:M BRANCH · MERGE |
| MULTI/ DEMULTIPLEXER | | MULTIPLEXING/ DEMULTIPLEXING OF SIGNAL LIGHTS HAVING DIFFERENT WAVELENGTHS |
| MONITOR CIRCUIT (TAP CIRCUIT) | | MONITORING OF CIRCUIT (TAP FOR OPTICAL SIGNAL) |
| INTERFERENCE CIRCUIT | | INTERFERENCE OF LIGHTWAVE LIGHT FREQUENCY FILTER |
| RING RESONATOR | | RESONANCE OF LIGHTWAVE LIGHT FREQUENCY FILTER |
| SWITCH | | 2×2 OPTICAL SWITCH |

POLYMER CORE OPTICAL WAVE-GUIDE AND FABRICATION METHOD THEREOF

BACKGROUND OF THE INVENTION

1. Field of the Invention

The present invention relates to a low loss and stable optical wave-guide structure using a polymer material as the core of the optical wave-guides and their fabrication methods thereof.

2. Description of the Related Art

In order to attain high performance, high integration and low cost of an optical device, the research and development on the optical device having optical wave-guide structure has been actively carried out.

As the materials for the optical wave-guide, the following materials have been studied to be used: semiconductors (Si, GaAs, InP etc.), dielectric materials (ferroelectric materials such as $LiNbO_3$, $LiTaO_3$; glasses such as $SiO_2$ glass group, compound glass group etc.; polymers such as polymethacrylic acid methyl, polystyrene, polycarbonate, polyimide etc.). For example, $SiO_2$ is used as a material for optical wave-guide in Japanese Patent Application Laid-Open No.3-158802 (1991), polymer such as polyimide is used as a material for optical wave-guide in Japanese Patent Application Laid-Open No.3-188402 (1991) or Japanese Patent Application Laid-Open No.4-9807 (1992).

Among the above mentioned optical wave-guides, an optical wave-guide made of polymer has recently attracted great interest, since it can be fabricated with a simple process and in low cost. Therefore, the inventors of the present invention have studied a method shown in FIG. 8 in order to develop a method of fabricating polymer optical wave-guides.

Firstly, a buffer layer 2 made of a polymer material having a low refractive index ($n_b$) is formed on a Si substrate 1 as shown in FIG. 8 (a).

Next, a core layer 3 (refractive index $n_w$, $n_w > n_b$) made of a polymer material is formed on the polymer buffer layer 2 as shown in FIG. 8 (b).

The buffer layer and the core layer described above are formed through spreading the polymers dissolved in a solvent by a spin coating method.

Then, a photoresist film is spread over the polymer core layer 3 as shown in FIG. 8 (c). After heating the photoresist film, a mask pattern is exposed on the photoresist by irradiating ultraviolet lays through a mask.

Next, a photoresist pattern 4 is formed on the polymer core layer 3 through developing, cleaning and drying.

Then, the polymer core layer 3 is formed in an approximately rectangle-shape as shown in FIG. 8 (d) through a dry etching process.

The dry etching process is carried out by using $O_2$ gas or $O_2$ gas mixed with a small amount of $CF_4$ as an etching gas.

Finally, the optical wave-guide shown in FIG. 8 (e) is fabricated by forming a polymer cladding layer 5 having a refractive index of $n_c$ ($n_c = n_b$) throughout the surface of the polymer core layer 3.

However, it has been revealed that there are the following problems in fabricating a polymer optical wave-guide through the method shown in FIG. 8.

(1) In order to forming the optical wave-guide shown in FIG. 8 (e), the thickness of the polymer buffer layer 2 needs to be more than 8 μm. Further, the thickness of the polymer core 3 needs to be several μm to ten several μm for a single-mode wave-guide, 10 μm to dozens μm for a multi-mode wave-guide. However, in the process in FIG. 8 (b), after forming the polymer buffer layer 2 made of polyimide having a thickness of more than 8 μm, the polymer solution (polymer dissolved in a solvent) for forming a polyimide polymer core layer 3 having a thickness of more than 4 μm is spread and heated at temperature of 90° C. for 30 minutes, and the remaining solvent is removed. For the next step, when the polymer solution is heated at temperature of 200° C. for 30 minutes, cracking occurs in the polymer core layer 3. A series of the experiments have been curried out with varying the heating time and the heating temperature. Cracking occurs in the every cases although there are differences in the amount of cracking produced. Studying the cause has revealed that [1] since the materials of the polymer buffer layer 2 and the polymer core layer 3 are the same and consequently the adhesion between them is strong, the strength of constriction of the polymer core layer 3 in the radial direction exceeds the strength of constriction in the thickness direction to cause the cracking; [2] since the thickness of the polymer core layer is too thick, the remaining stress becomes large to cause the cracking; [3] since the solvent in the polymer core 3 penetrates into the polymer buffer layer 2, cracking is caused on the surface of or in the inside of the polymer buffer layer 2, and further in the inside of the polymer core 3.

(2) Optical wave-guides have been fabricated through the processes (c), (d) and (e) in FIG. 8 using the polymer core having cracking described above. The result is that the optical wave-guides have a large scattering loss due to non-uniformity in the structure.

SUMMARY OF THE INVENTION

An object of the present invention is to provide a polymer core optical wave-guide of which the polymer for core, that is, transmission part of light, has no cracking in it and is uniform and low in loss and low in polarization characteristic.

The second object of the present invention is to provide a polymer core optical wave-guide which is capable of realizing a high integrated optical wave-guide circuit containing a passive optical circuit and an active optical circuit.

The third object of the present invention is to provide a polymer core optical wave-guide having high dimensional accuracy and a fabrication method thereof.

In order to attain the above objects, the polymer core optical wave-guide in accordance with the present invention is characterized by comprising a substrate, a buffer layer formed on the surface of the substrate made of a $SiO_xN_yH_z$ film ($0.72 \leq x < 1$; $0 < y \leq 0.25$; $0 < z \leq 0.03$) of desirable thickness having a refractive index of $n_b$, an approximately rectangle-shaped core formed on the buffer layer made of a polymer material having a refractive index of $n_w$ ($n_w > n_b$), a cladding layer covering the surface of the buffer layer and the surface of the core having a refractive index of $n_c$ ($n_c < n_w$).

According to the present invention, the polymer core is interposed between a buffer layer and a cladding layer formed of $SiO_xN_yH_z$ films. Therefore, since the polymer layers are not formed in a thick multi-layer as in conventional polymer layers, cracking does not occur in the polymer core. Further, even when Si is used as the substrate and an $SiO_xN_yH_z$ film buffer layer having thickness of several μm to ten several μm is formed on it, the stress in the Si substrate is extremely low in the structure according to the present invention. No cracking occurs in such a core layer formed on the buffer layer. The reason is as follows. In a case of laminating a polymer layer on a polymer layer, the adhesion between them is excellent and the constriction in the radial direction due to evaporation of solvent at heating is large, which causes cracking. On the other hand, in the case of adhering an $SiO_xN_yH_z$ layer to a polymer layer, since the adhesion is not so hard as the above case and the stresses do not remain in the $SiO_xN_yH_z$ layer and in the Si layer because of forming the film through plasma CVD method, cracking does not cause.

The refractive index of $SiO_xN_yH_z$ film can easily be varied from 1.46 to near 1.60 depending on the amount of N content as shown in FIG.2. Hereon, the result in FIG. 2 has been obtained from an experiment performed by the inventors of the present invention. Since the refractive indexes of most of polymers (for example, polyimide) are fall within 1.48 to 1.62, the refractive index of $SiO_xN_yH_z$ is within a suitable range when the difference of specific refractive indexes are set in point several % to several %. That is, when an $SiO_xN_yH_z$ film is used for the cladding (buffer) layer in a case of using a polymer for core, the $SiO_xN_yH_z$ is one of most suitable material for an optical wave-guide.

Furthermore, when a polymer is used for a core, it is difficult to cut and polish the edge of the core because the polymer is soft. On the other hand, by interposing the polymer core between the $SiO_xN_yH_z$ layers of hard material, it becomes easy to cut and polish its edge and to machine it with a high dimensional accuracy.

Incidentally, the $SiO_xN_yH_z$ layer can be easily formed with plasma CVD method in low temperature (below 300° C.). In the other case, an indented groove is formed on an Si substrate, a buffer layer of $SiO_xN_yH_z$ film being formed on the surface of the indented groove with plasma CVD method. After that, a polymer solution is pored in the indented groove to fill the indented groove. Then it is heated to be hardened and to form a polymer core layer 3. Therefore, it is realized to obtain a polymer core layer having an edge of extremely low roughness. This is effective for lowering the loss in an optical wave-guide.

In addition to these, since the polymer core layer does not cover the whole surface of the $SiO_xN_yH_z$ buffer layer, the optical wave-guide can be fabricated under a condition of low stress.

According to a further feature of the present invention, since the contact surface between the polymer core layer and the polymer cladding layer is only on the upper surface of the polymer core layer, cracking due to existence of stress hardly occurs. In addition to this, since most part of the polymer cladding layer contacts to the $SiO_xN_yH_z$ buffer layer, cracking due to stress does not occur.

According to a still further feature of the present invention, since the $SiO_xN_yH_z$ film sufficiently capable of covering the range of refractive indexes of polymers is used for the buffer layer and the cladding layer, it is possible to use various kinds of polymer materials such as, for example, polyimide, polycarbonate, polymethacrylic acid methyl, polystyrene and so on.

According to another feature of the present invention, by means of employing straight line, curved line, S-shaped curved line, ring-shaped line, parallel lines as the core pattern, it is possible to realize optical circuits such as an optical branching/merging circuit, an optical star coupler, an optical multi/demultiplexing circuit, an optical filter, an optical tap and so on. When polymer is used for the core and an $SiO_xN_yH_z$ film is used for the cladding layer as described above, it is possible to make the size of wave-guide small because the difference of specific refractive indexes can be set large. A small sized wave-guide can realize a high integrated optical circuit on a single substrate. Further, since the size of the wave-guide can be made small, the transmission loss of the wave-guide decreases and the fabrication cost can be lowered by decreasing the amount of materials to be used.

According to a further feature of the present invention, since the $SiO_xN_yH_z$ buffer film used for the buffer layer and the cladding layer is compatible with the materials such as semiconductors, dielectric materials, magnetic materials and so on. Therefore, it is possible to use various kinds of substrates. Therewith, it is possible to realize optical wave-guide circuits incorporating not only with passive optical circuits but with active optical circuits such as a semiconductor laser, an optical receiver element, an optical amplifier, an optical modulator, an optical switch and so on.

According to a still further feature of the present invention, by means of forming a second cladding layer on the cladding layer made of a material selected from the group consist of $SiO_2$, $SiO_2$ containing at least one kind of additives for controlling refractive index, the second cladding layer serves as a protection layer to suppress increase of loss in the optical wave-guide, as well as serves as a protective layer against deformation in the edge of polymer core due to its softness when the optical wave-guide is cut and polished on the edge. That is, since the polymer core is protected with hard material members of the substrate in the bottom and the second cladding layer, it is easy to cut and polish the edge of polymer core. Thus, it is possible to realize the perpendicularity in the edge of optical wave-guide reproducibly.

A still further feature of the present invention is in a fabrication method of the polymer core optical wave-guide. That is, the fabrication method of polymer core optical wave-guide which is characterized by comprising a process for forming layers on the surface of a substrate in order of a buffer layer of $SiO_xN_yH_z$ film, a core layer of polymer material, a mask layer of $SiO_xN_yH_z$ film, a process for forming a photoresist pattern on the $SiO_xN_yH_z$ mask layer through a photolithography process, a process for patterning the $SiO_xN_yH_z$ mask layer using the photoresist pattern as a mask through a dry etching process, a process for etching the polymer layer using the $SiO_xN_yH_z$ mask pattern as a mask through a dry etching process, a process for covering the surface of the dry etched polymer core with a cladding layer.

According to the fabrication method in the present invention, the $SiO_xN_yH_z$ mask layer serves as a mask when the polymer core layer is etched with dry etching to form an approximately rectangular-shaped core, as well as serves a protective layer to suppress increase of loss due to contamination of the polymer core layer and roughness on the polymer core layer. Further, since the polymer core layer can be etched with a large selectivity ratio (ratio of the etching rate of polymer core layer to the etching rate of $SiO_xN_yH_z$ mask), the polymer core can be formed in an excellent perpendicularity and in a high dimensional accuracy.

BRIEF DESCRIPTION OF THE DRAWINGS

FIG. 7 is a graph showing examples of core patterns in the polymer core optical wave-guide in accordance with the present invention.

DETAILED DESCRIPTION OF THE PREFERRED EMBODIMENTS

The present invention will be described in detail below, referring to the accompanying drawings.

Figure 1:
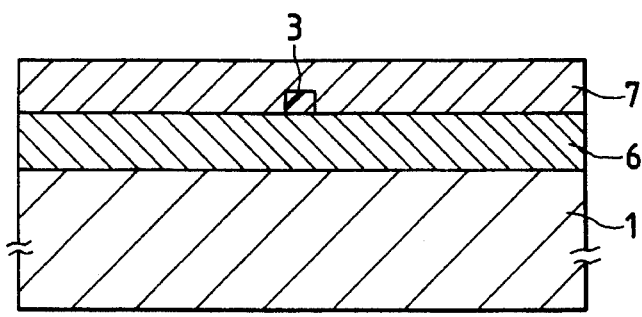
FIG. 1 is a view explaining an embodiment of a polymer optical wave-guide in accordance with the present invention.
Figure 2:
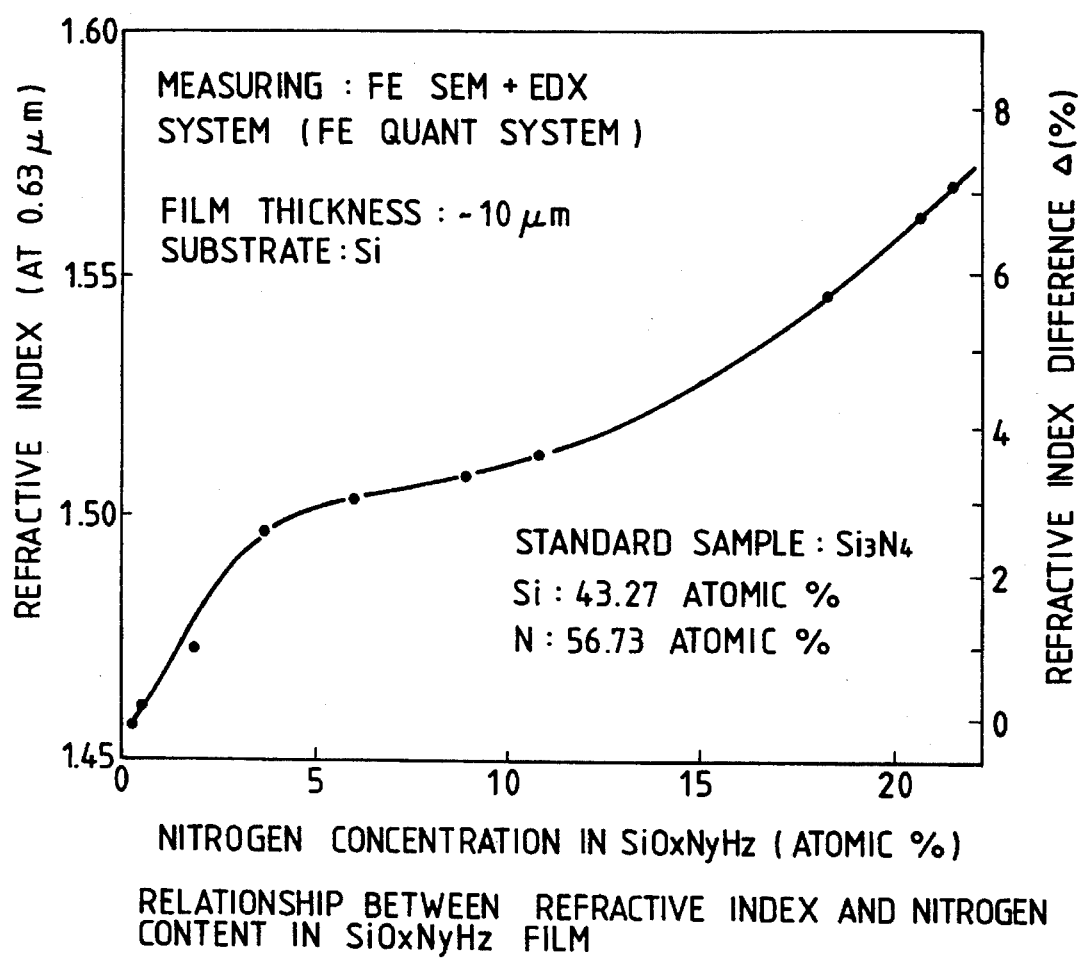
FIG. 2 is a graph showing the relationship between refractive index and Nitrogen concentration in the $SiO_xN_yH_z$ film used in the present invention (the result experimentally obtained by the inventors of the present invention).

FIG. 1 shows the first embodiment of a polymer optical wave-guide according to the present invention.

As the materials for the substrate 1, the following materials can be used: semiconductors (Si, GaAs, InP etc.), dielectric materials (ferroelectric materials such as $LiNbO_3$, $LiTaO_3$; glasses such as $SiO_2$ glass group, compound galss group etc.; polymers such as epoxy resin, polycarbonate, polyimide, Teflon etc.). However, an Si substrate is used in the embodiment. A buffer layer 6 made of a $SiO_xN_yH_z$ film ($0.72 \leq x<1$; $0<y \leq 0.25$; $0<z \leq 0.03$) is formed on the surface of the Si substrate 1. The $SiO_xN_yH_z$ buffer layer 6 is formed through plasma CVD method. In other words, a lower electrode and an upper electrode are placed in a reaction chamber evacuated to vacuum, the Si substrate 1 being placed on the lower electrode and heated to approximately 270° C., high frequency electric power being applied to the both electrodes to produce plasma, the $SiO_xN_yH_z$ film being formed by flowing a mixed gas of $SiH_4$, $N_2O$ and $N_2$ in the plasma environment. The $SiO_xN_yH_z$ film is formed such as to have a thickness of approximately 8 μm, the content of Nitrogen being controlled to 18 atomic % so that the refractive index (the value for wavelength of 0.63 μm) becomes 1.5415.

Figure 5:
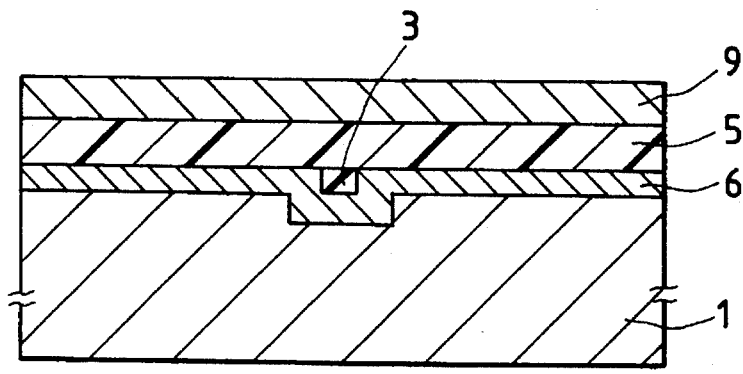
FIG. 5 is a view explaining an embodiment of a polymer optical wave-guide in accordance with the present invention.
Figure 6A:
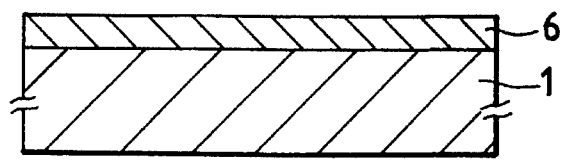
FIGS. 6(a)–6(g) are views explaining a fabrication method of a polymer optical wave-guide in accordance with the present invention.
Figure 6B:
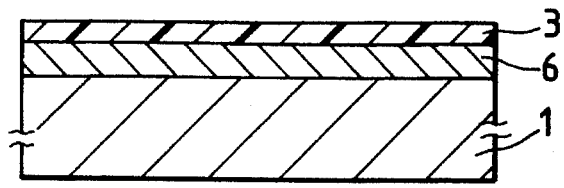
Figure 6C:
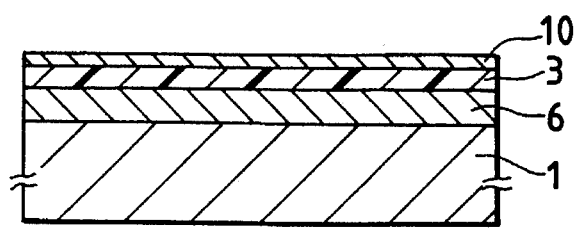
Figure 6D:
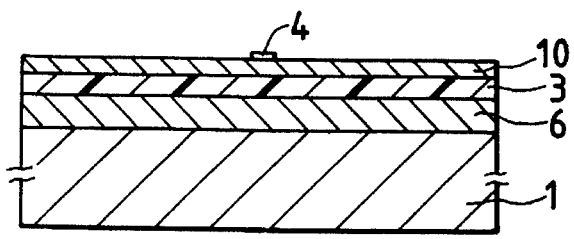
Figure 6E:
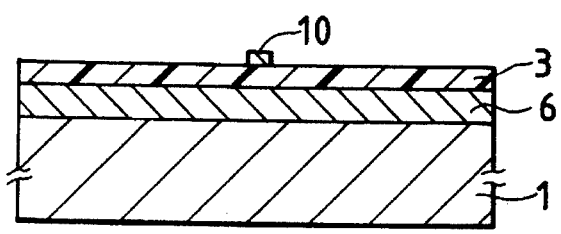
Figure 6F:
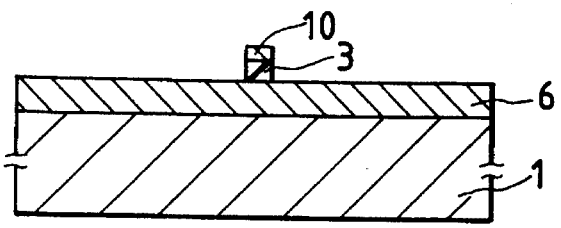
Figure 6G:
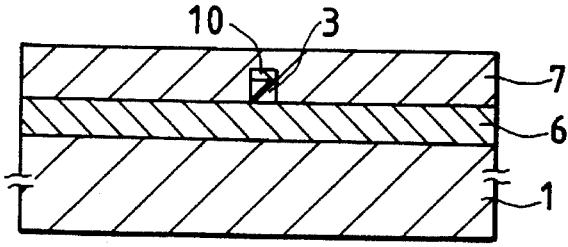
Figure 8A:
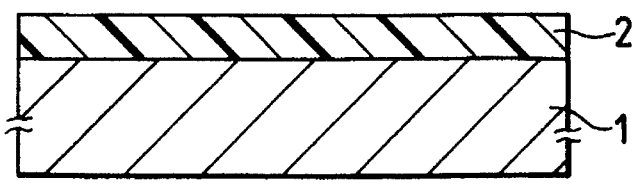
FIGS. 8(a)–8(e) are views explaining a conventional fabrication method of a polymer optical wave-guide studied by the inventors of the present invention.
Figure 8B:
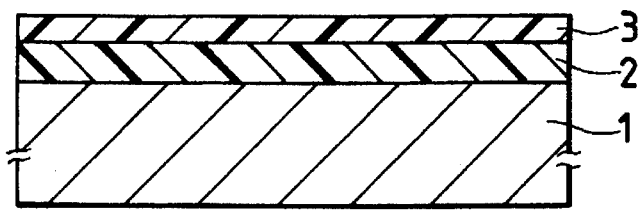
Figure 8C:
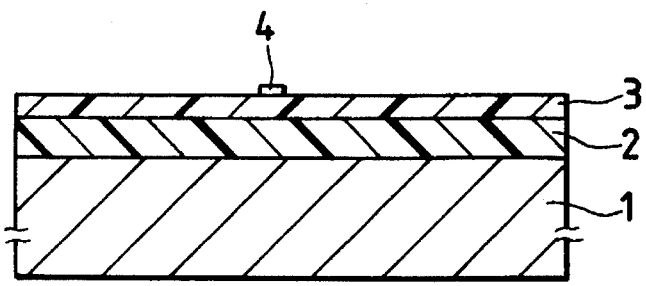
Figure 8D:
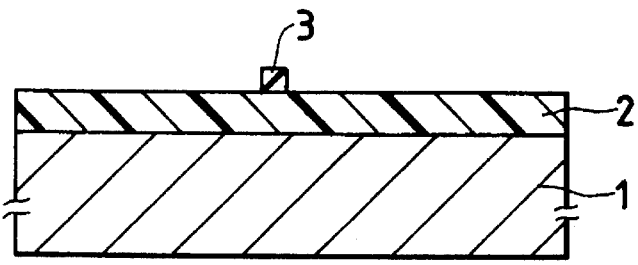
Figure 8E:
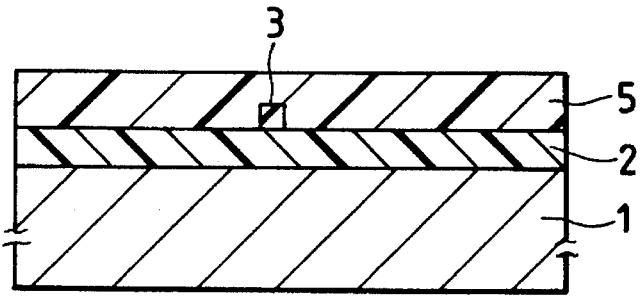

Since the fabrication method of this $SiO_xN_yH_z$ film has been described in detail by an inventor of the present invention in each of the following papers: the TECHNICAL REPORT OF IEICE OQE92-110 (1992-10) with referring to FIG. 5 on page 11 and the Materials in Microelectronic and Optoelectronic Packaging, Vol. 33 (1992-11) with referring to FIG. 13 on page 52, the explanation will be omitted here.

The warpage of the Si substrate forming the $SiO_xN_yH_z$ film on it is less than 7 μm for a substrate having diameter of 3 inches. The warpage is a very small value. Polyimide (film made of a mixture of product number PIQ-W100 and PIQ-W200 which are products of Hitachi Chemicals Co.) is used for the polymer core layer 3 over the buffer layer. The polymer core layer 3 in this embodiment is set for a single mode core and for light wave length of 0.83 μm, and has refractive index of 1.5560 (for wavelength of 0.63 μm), a core width of 5 m and a core thickness of 3 μm. The above polyimide is formed by spreading the PIQ-W100 and the PIQ-W200 dissolved in dimethyl acetamide solvent on the buffer layer through spin coating method, then by heating it at 90° C. for 30 minutes, at 200° C. for 30 minutes and at 350° C. for 1 hour. After that, a photoresist pattern is formed on the polyimide core layer in photo-lithography process. Next, in dry-etching process, dry-etching is performed in a plasma environment using $O_2$ gas as etching gas (reactive ion etching) to obtain an approximately rectangular-shaped polymer core layer 3. Finally, a $SiO_xN_yH_z$ cladding layer 7 is formed on the surface through the plasma CVD method described above to obtain an optical wave-guide. The thickness of the $SiO_xN_yH_z$ cladding layer 7 is 8 μm and the refractive index is the same as that of the buffer layer.

By the process described above, the polymer core wave-guide has no cracking. That is, the warpage of the Si substrate after the step of forming the polyimide core layer has hardly increased after the step of forming the $SiO_xN_yH_z$ cladding layer 7.

Figure 3:
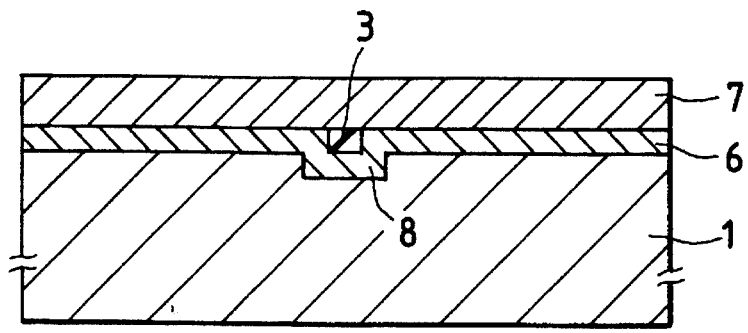
FIG. 3 is a view explaining an embodiment of a polymer optical wave-guide in accordance with the present invention.

FIG. 3 shows the second embodiment of a polymer core optical wave-guide in accordance with the present invention. In this embodiment, an indented portion 8 for embedding a core pattern is provided on the surface of the Si substrate 1 in advance. After forming a $SiO_xN_yH_z$ buffer layer 6 on the surface of the Si substrate having the indented porion 8, polyimide solution is poured in the indented portion 8 and is heated to form polyimide embedded in the groove of the indented portion 8. The feature of this optical wave-guide is that since there is no need to form the polyimide core layer in the approximately rectangular-shape by dry etching, the roughness of the side surface of the core can be suppressed very small. This makes the scattering loss of optical wave-guide small. Further, there is no need to cover the whole surface of the $SiO_xN_yH_z$ buffer layer with the polyimide core layer in order to obtain the rectangular-shaped polymer core layer 3. Therefore, occurrence of stress can be suppressed.

Figure 4:
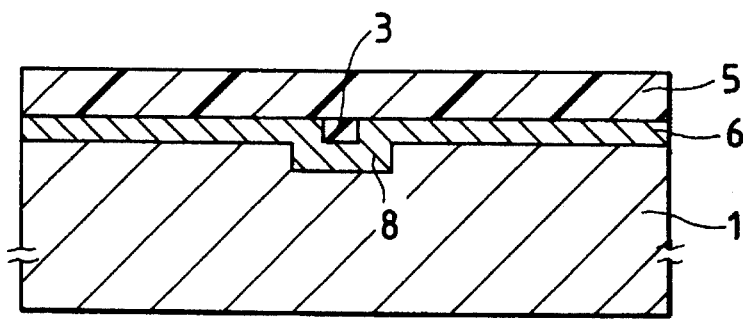
FIG. 4 is a view explaining an embodiment of a polymer optical wave-guide in accordance with the present invention.

FIG. 4 also shows the third embodiment of a polymer core optical wave-guide in accordance with the present invention. In this embodiment, a polymer cladding layer 5 is used instead of the $SiO_xN_yH_z$ cladding layer in FIG. 3. In the structure, since the polymer core layer 3 and the polymer cladding layer 5 do not contact to each other in a wide area, the cracking due to occurrence of stress hardly takes place.

FIG. 5 also shows the fourth embodiment of a polymer core optical wave-guide in accordance with the present invention. In this embodiment, as described above, by means of forming a second cladding layer on the cladding layer made of a material selected from the group consist of $SiO_2$, $SiO_2$ containing at least one kind of additives for controlling refractive index, the second cladding layer serves as a protection layer to suppress increase of loss in the optical wave-guide, as well as serves as a protective layer against deformation in the edge of polymer core due to its softness when the optical wave-guide is cut and polished on the edge. That is, since the polymer core is protected with hard material members of the substrate in the bottom and the second cladding layer, it is easy to cut and polish the edge of polymer core. Thus, it is possible to realize the perpendicularity in the edge of optical wave-guide reproducibly. It is preferable that the refractive index of the second cladding layer 9 is equal to or lower than the refractive index of the polymer cladding layer 5. The second cladding layer 9 may be a glass plate. In this case, the polymer cladding layer 5 and the above glass plate may be fixed to each other by using adhesive.

FIG. 6 shows an embodiment of a fabrication method of a polymer core optical wave-guide in accordance with the present invention. The feature of the fabrication method is that the $SiO_xN_yH_z$ mask layer serves as a mask when the polymer core layer is etched with dry etching to form an approximately rectangular-shaped core, as well as serves a protective layer to suppress increase of loss due to contamination of the polymer core layer. Further, since the polymer core layer can be etched with a large selectivity ratio, the polymer core can be formed in an excellent perpendicularity and in a high dimensional accuracy. The fabrication method will be described below, referring to the figure. Firstly, as shown in FIG. 6 (a), a buffer layer 6 of $SiO_xN_yH_z$ film is formed on the surface of a substrate 1. This $SiO_xN_yH_z$ buffer layer 6 may be formed through the plasma CVD method using a metallic alkoxide liquid (for example, $Si(OC_2H_5)_4$), $N_2O$ and $N_2$, or through an electron beam vapor deposition method using a mixing tablet of $SiO_2$ and $Si_3N_4$, other than through the plasma CVD method using the gas mixture of $SiH_4$, $N_2O$ and $N_2$ as described above. Next, as shown in FIG. 6 (b), a polymer core layer 3 is formed on the $SiO_xN_yH_z$ buffer layer 6. Then, as shown in FIG. 6 (c), a $SiO_xN_yH_z$ mask layer 10 is formed on the polymer core layer 3. The $SiO_xN_yH_z$ mask layer 10 will serves as a part of a cladding layer later. The refractive index of the $SiO_xN_yH_z$ mask layer 10 is chosen to be equal to or lower than the refractive index of the $SiO_xN_yH_z$ cladding layer 7 which is formed later. The $SiO_xN_yH_z$ mask layer 10 is also formed through the low temperature (lower than 300° C.) plasma CVD method. On this $SiO_xN_yH_z$ mask layer 10, a photoresist pattern 4 is formed through a photolithography process as shown in FIG. 6(d). Subsequently, the patterning of a $SiO_xN_yH_z$ mask layer 10 using photoresist pattern 4 is carried out through a dry etching process as shown in FIG. 6 (e). At this moment, $CHF_3$ gas is used as the etching gas, the etching being carried out under a low gas pressure of 0.05 to 0.01 Torr. Then dry etching of the polymer core layer 3 to form into an approximately rectangular shape is carried out using the $SiO_xN_yH_z$ mask layer 10 as shown in FIG. 6 (f). At this moment, $O_2$ gas or $O_2$ added with $CF_4$ gas is used as the etching gas. Finally, the whole surface dry-etched shown in FIG. 6 (f) is covered with an $SiO_xN_yH_z$ cladding layer 7 as shown in FIG. 6(g). Thus a polymer core optical wave-guide is fabricated.

Although Si has been used as a substrate in the above embodiment, the material is not limited to Si and various kinds of materials may be used for the substrate as described above. Further, various kinds of polymer materials other than polyimide may be used as the material for the polymer core layer 3.

It is obvious that the fabrication method of polymer core shown in FIG. 6 can be applied to the embodiments of the present invention shown in FIG. 2 to FIG. 5.

FIG. 7 shows the examples of core patterns in the polymer core wave-guide in accordance with the present invention. As shown in the figure, by means of employing straight line, curved line, S-shaped curved line, ring-shaped line, parallel lines as the core pattern, it is possible to realize optical circuits such as an optical branching/merging circuit, an optical star coupler, an optical multi/demultiplexing circuit, an optical filter, an optical tap and so on. Since the polymer core wave-guide in accordance with the present invention employs an $SiO_xN_yH_z$ film for the cladding layer, it is possible to make the size of wave-guide small because the difference of specific refractive indexes can be set large. A small sized wave-guide can realize a high integrated optical circuit on a single substrate. Further, since the size of the wave-guide can be made small, the transmission loss of the wave-guide decreases and the fabrication cost can be lowered by decreasing the amount of materials to be used.

Since the $SiO_xN_yH_z$ film used for the buffer layer and the cladding layer is compatible with the materials such as semiconductors, dielectric materials, magnetic materials and so on, it is possible to use various kinds of substrates (semiconductors, dielectric materials, magnetic materials and so on). Therewith, it is possible to realize optical wave-guide circuits incorporating not only with passive optical circuits but with active optical circuits such as a semiconductor laser, an optical receiver element, an optical amplifier, an optical modulator, an optical switch and so on.

As described above, the polymer core optical wave-guide and fabrication method thereof according to the present invention has the following effects.

(1) It is possible to obtain a polymer core optical wave-guide of which the polymer for core, that is, transmission part of light, has no cracking in it and is uniform.

(2) It is possible to obtain an optical wave-guide which is low in loss and low in polarization characteristic since the remaining stress in the optical wave-guide is extremely low.

(3) Since the $SiO_xN_yH_z$ film sufficiently capable of covering the range of refractive indexes of polymers is used for the cladding layer (the buffer layer), it is possible to use various kinds of polymer materials. Since the $SiO_xN_yH_z$ film is a hard material comparing to polymer materials and the polymer core is protected with the hard materials, it is easy to cut and polish the edge of polymer core with a high dimensional accuracy.

(4) Since after forming an indented portion on a substrate and forming a $SiO_xN_yH_z$ film on the indented portion, polymer solution is poured in the groove of the indented portion 8 to form a rectangular-shaped polymer core, the roughness of the side surface of the core can be suppressed very small. It is possible to make the scattering loss of optical wave-guide small.

(5) By means of forming a second cladding layer on the cladding layer made of a material selected from the group consist of $SiO_2$, $SiO_2$ containing at least one kind of additives for controlling refractive index, the second cladding layer serves as a protection layer to suppress increase of loss in the optical wave-guide, as well as serves as a protective layer against deformation in the edge of polymer core due to its softness when the optical wave-guide is cut and polished on the edge. That is, since the polymer core is protected with hard material members of the substrate in the bottom and the second cladding layer, it is easy to cut and polish the edge of polymer core. Thus, it is possible to realize the perpendicularity in the edge of optical wave-guide reproducibly.

(6) The $SiO_xN_yH_z$ mask layer serves as a mask when the polymer core layer is etched with dry etching to form an approximately rectangular-shaped core, as well as serves a protective layer to suppress increase of loss due to contamination of the polymer core layer. Further, since the polymer core layer can be etched with a large selectivity ratio, the polymer core can be formed in an excellent perpendicularity and in a high dimensional accuracy.

What is claim is:

1. A polymer core optical wave-guide which comprises a substrate, a buffer layer formed on the surface of the substrate made of a $SiO_xN_yH_z$ film wherein $0.72 = x < 1$; $0 < y \leq 0.25$; $0 < z \leq 0.03$, of desirable thickness having a refractive index of $n_b$, an approximately rectangle-shaped core formed on the buffer layer made of a polymer material having a refractive index of $n_w$ ($n_w > n_b$), a cladding layer covering the surfaces of the buffer layer and the core having a refractive index of $n_c$ ($n_c < n_w$).

2. A polymer core optical wave-guide according to claim 1, wherein the cladding layer is made of a $SiO_xN_yH_z$ film.

3. A polymer core optical wave-guide according to claim 1, wherein the cladding layer is made of a polymer material.

4. A polymer core optical wave-guide according to claim 1, wherein a thin $SiO_xN_yH_z$ film, wherein ($0.72 \leq x < 1$; $0 < y \leq 0.25$; $0 < z \leq 0.03$), is formed between the upper surface of the core and the cladding layer.

5. A polymer core optical wave-guide according to claim 1, wherein an indented shaped portion is formed on the surface of the substrate, a buffer layer of $SiO_xN_yH_z$ film, wherein ($0.72 \leq x < 1$; $0 < y \leq 0.25$; $0 < z \leq 0.03$), being formed on the surface of the substrate, a core made of a polymer material being embedded in the indented portion of the buffer layer, the buffer layer and the surface of the core being covered with a cladding layer.

6. A polymer core optical wave-guide according to claim 1, wherein the core is made of a polymer material selected from the group consisting of polyimide, polycarbonate, polymethacrylic acid methyl and polystyrene.

7. A polymer core optical wave-guide according to claim 1, wherein the approximately rectangular-shaped core has at least one of core patterns selected from the group consisting of straight line, curved line, S-shaped curved line, ring-shaped line and, parallel lines.

8. A polymer core optical wave-guide according to claim 1, wherein the substrate is made of a material selected from the group of semiconductor, dielectric material, magnetic material.

9. A polymer core optical wave-guide according to claim 1, wherein the substrate is made of a material selected from the group consisting of semiconductor material, dielectric material, and magnetic material.

10. A polymer core optical wave-guide according to claim 1, which comprises a second cladding layer on the cladding layer made of a material selected from the group consisting of $SiO_2$ glass, and $SiO_2$ glass containing at least one kind of additives for controlling refractive index.

11. A fabrication method of polymer core optical wave-guide, comprising the steps of:

forming layers on the surface of a substrate in the order of a buffer layer of $SiO_xN_yH_z$ film, wherein ($0.72 \leq x < 1$; $0 < y \leq 0.25$; $0 < z \leq 0.03$) a core layer of polymer material, a mask layer of $SiO_xN_yH_z$ film, wherein ($0.72 \leq x < 1$; $0 < y \leq 0.25$; $0 < z \leq 0.03$), forming a photoresist pattern on the mask layer of $SiO_xN_yH_z$ film through photo-lithography, patterning the mask layer of $SiO_xN_yH_z$ film using the photoresist pattern as a mask through dry etching, etching the polymer layer using the $SiO_xN_yH_z$ mask pattern as a mask through dry etching, and covering the surface of the dry etched polymer core with a cladding layer.

12. A fabrication method of polymer core optical wave-guide according to claim 11, which comprises a process for forming a second cladding layer on the cladding layer made of a material selected from the group consisting of $SiO_2$, and $SiO_2$ containing at least one kind of additives for controlling refractive index.

13. A fabrication method of polymer core optical wave-guide according to claim 11, wherein the core contains at least one of core patterns selected from the group consisting of straight line, curved line, S-shaped curved line, ring-shaped line, and parallel lines.

14. A fabrication method of polymer core optical wave-guide comprising the steps of:

forming an indented shaped portion on the surface of a substrate, forming a buffer layer of $SiO_xN_yH_z$ film, wherein ($0.72 \leq x < 1$; $0 < y \leq 0.25$; $0 < z \leq 0.03$) on the substrate, forming a core layer of polymer material in the indented portion corresponding to the indented portion of the buffer layer, forming a mask layer of $SiO_xN_yH_z$ film, wherein ($0.72 \leq x < 1$; $0 < y \leq 0.25$; $0 < z \leq 0.03$), on the buffer layer and the surface of the core, the mask layer of $SiO_xN_yH_z$ film serving as a part of a cladding layer, forming a photoresist pattern on the mask layer of $SiO_xN_yH$film through photo-lithography, patterning the mask layer of $SiO_xN_yH_z$ film using the photoresist pattern as a mask through dry etching, etching the polymer layer using the $SiO_xN_yH_z$ mask pattern as a mask through dry etching, and covering the surface of the dry etched polymer core with a cladding layer.

15. A fabrication method of polymer core optical wave-guide according to claim 14, which comprises a process for forming a second cladding layer on the cladding layer made of a material selected from the group consisting of $SiO_2$, $SiO_2$ containing at least one kind of additives for controlling refractive index.

16. A fabrication method of polymer core optical wave-guide according to claim 14, wherein the core contains at least one of core patterns selected from the group consisting of straight line, curved line, and S-shaped curved line, ring-shaped line, parallel lines.

* * * * *